(12) United States Patent
Hogg, Jr. et al.

(10) Patent No.: US 8,135,115 B1
(45) Date of Patent: Mar. 13, 2012

(54) SYSTEM AND METHOD FOR MULTI-CHANNEL RECORDING

(75) Inventors: John S. Hogg, Jr., Bedford, TX (US); Christopher R. McFarlen, Coppell, TX (US)

(73) Assignee: Securus Technologies, Inc., Dallas, TX (US)

( * ) Notice: Subject to any disclaimer, the term of this patent is extended or adjusted under 35 U.S.C. 154(b) by 1512 days.

(21) Appl. No.: 11/603,938

(22) Filed: Nov. 22, 2006

(51) Int. Cl.
*H04M 1/64* (2006.01)

(52) U.S. Cl. ............... 379/88.22; 370/260; 379/88.01; 379/88.08; 379/88.19; 379/202.01; 379/207.01; 704/270; 709/201

(58) Field of Classification Search .......... 370/259–271, 370/351–356; 379/37–51, 67.1–88.28, 93.01–93.07, 379/201.01, 201.02, 202.01–207.01, 265.01–266.1; 704/270–278; 709/201–207, 217–244
See application file for complete search history.

(56) References Cited

U.S. PATENT DOCUMENTS

| | | | |
|---|---|---|---|
| 5,559,875 A * | 9/1996 | Bieselin et al. .......... | 379/202.01 |
| 6,249,570 B1 * | 6/2001 | Glowny et al. ........... | 379/88.22 |
| 6,298,129 B1 * | 10/2001 | Culver et al. ............ | 379/202.01 |
| 6,647,096 B1 | 11/2003 | Milliorn et al. | |
| 6,665,376 B1 * | 12/2003 | Brown .................. | 379/85 |
| 6,665,380 B1 * | 12/2003 | Cree et al. .............. | 379/88.25 |
| 7,058,163 B1 | 6/2006 | Parekh et al. | |
| 7,079,637 B1 | 7/2006 | McNitt et al. | |
| 7,861,088 B1 * | 12/2010 | Brothers ................ | 713/178 |
| 2005/0141678 A1 * | 6/2005 | Anders ................. | 379/67.1 |
| 2007/0036283 A1 * | 2/2007 | Shaffer et al. ........... | 379/67.1 |
| 2007/0071206 A1 * | 3/2007 | Gainsboro et al. ........ | 379/168 |
| 2007/0133437 A1 * | 6/2007 | Wengrovitz et al. ...... | 370/260 |

OTHER PUBLICATIONS

U.S. Appl. No. 10/135,878, filed Apr. 29, 2002.
U.S. Appl. No. 10/720,848, filed Nov. 24, 2003.
U.S. Appl. No. 11/334,522, filed Nov. 8, 2006.

* cited by examiner

*Primary Examiner* — Hemant Patel
(74) *Attorney, Agent, or Firm* — Fogarty, L.L.C.

(57) ABSTRACT

Embodiments of the present invention are directed generally to recording communication of a call utilizing a multi-channel recording technique. According to one exemplary embodiment, inbound communication from each party to a call (e.g., from each communication device that is party to a call) to a recording system is assigned to a separate channel, and communication on each channel is independently recorded. Further, during the call, a control channel is generated that correlates the multiple communication channels. The independently recorded communication channels and control channel may be used to analyze a recorded call from any desired perspective. For instance, communication from a given party may be analyzed in isolation. Further, the control channel enables the recorded multiple communication channels to be correlated such that the communication received (e.g., heard) by any selected party may be accurately re-created for analysis thereof.

28 Claims, 4 Drawing Sheets

SYSTEM AND METHOD FOR MULTI-CHANNEL RECORDING

CROSS-REFERENCE TO RELATED APPLICATIONS

This application is related to co-pending and commonly assigned U.S. patent application Ser. No. 10/135,878, filed Apr. 29, 2002, titled "INFORMATION MANAGEMENT AND MOVEMENT SYSTEM AND METHOD"; Ser. No. 10/720,848, filed Nov. 24, 2003, titled "INFORMATION MANAGEMENT AND MOVEMENT SYSTEM AND METHOD"; Ser. No. 10/420,585 filed Apr. 22, 2003, titled: "SYSTEM AND METHOD FOR DETECTING UNAUTHORIZED CALL ACTIVITY"; Ser. No. 11/334,522 filed Jan. 18, 2006, titled "SYSTEM AND METHOD FOR KEYWORD DETECTION IN A CONTROLLED ENVIRONMENT FACILITY USING A HYBRID APPLICATION"; and U.S. Pat. No. 7,058,163, titled "SYSTEM AND METHOD FOR EX POST FACTO PRESERVING A RECORDED CONVERSATION", the disclosures of which are hereby incorporated herein by reference.

TECHNICAL FIELD

The following description relates generally to call recording systems and methods, and more particularly to systems and methods for recording a call via multiple channels.

BACKGROUND OF THE INVENTION

Correctional facilities have traditionally recorded telephone conversations of its inmates. Such recordings may be conducted pursuant to a variety of rules that range anywhere from only recording conversations of calls made to specific telephone numbers, calls made by specific inmates or made using specific telephones, to recording every single call. Recording of inmate telephone calls is well known. Such recordings may be monitored by appropriate authorities to detect information regarding the security of facilities, continuing or past criminal activity, etc. Monitoring of the recordings may be performed manually (e.g., by a person listening to the recording) and/or may be performed robotically (or autonomously) by, for example, computer processing logic for analyzing the recordings for certain keywords, etc. In some instances, the recordings may be stored for later use, such as for later investigations, later used as evidence in a court of law, etc.

Various techniques for recording telephone calls are known. Examples of known recording techniques include those described in U.S. Pat. No. 6,647,096 titled "SYSTEM AND METHOD FOR REMOTELY CONTROLLING AUTOMATED CALL PLACEMENT CALL MONITORING FUNCTIONS," U.S. Pat. No. 6,665,376 titled "SELECTIVELY ACTIVATED INTEGRATED REAL-TIME RECORDING OF TELEPHONE CONVERSATIONS WITH AUTOMATED DOCUMENTATION OF CONSENT TO CALL RECORDING," and those described in U.S. Pat. No. 7,058,163, titled "SYSTEM AND METHOD FOR EX POST FACTO PRESERVING A RECORDED CONVERSATION", the disclosures of which are hereby incorporated herein by reference. Traditionally, telephone calls have been recorded using a "single-channel" recording. Such a single-channel recording records audio of the call from a single perspective (or "point of view"). As examples, the recording may be from the perspective of the person originating the call (i.e., the audio heard by the originating party), from the perspective of the called party (i.e., the audio heard by the called party), or from the perspective of an eavesdropper to the call (i.e., the audio heard by an eavesdropper). In a case in which an interactive voice response (IVR) system is involved in the call, the call may be recorded from the perspective of such IVR.

In some recording systems, the perspective of the recording may change during a call. For instance, when a call is initiated, the recording system may start recording of the call from the perspective of the originating party. Then, the recording system may change its perspective to that of an IVR system that is managing the call (e.g., the IVR may interact with the originating party and/or called party to establish a payment arrangement for the call, etc.). For example, when the call is first connected to the called party an IVR may interact with the called party to inform the party of the inmate who originated the call and ask the called party whether he agrees to accept charges for the call. Audio from the IVR may be provided solely to the called party (e.g., the originating party may be temporarily switched away from the call so as not to hear the called party or the IVR). Thus, when recording from the IVR's perspective, the audio from the called party is recorded, but any audio occurring on the originating party's side of the call during this portion of the call is not recorded. Thereafter, the originating party and called party may be connected together and the recording system may record an overall perspective of the audio being communicated during the call (e.g., recording from the perspective of an eavesdropper to the call). However, the traditional recording systems use a single-channel recording, and thus for any given point during the call, a recording captures audio from a single perspective. Thus, while the perspective may change during the course of a call, at any given point of a call, the recording captures audio from only a single perspective.

BRIEF SUMMARY OF THE INVENTION

The inventors of the present application have recognized that the above-mentioned single-channel recording technique has certain shortcomings. In some instances, such a single-channel recording technique results in difficulty in a reviewer (either human or robotic reviewer) distinguishing what each party to a call said. For example, suppose a recording is being captured from an eavesdropper's perspective; in this case, where conversations overlap (e.g., two or more parties are speaking at the same time), it may be difficult to decipher what either party said. As a further example, suppose a recording is being captured from the perspective of an originating party; in some recording systems the audio from the originating party will not be captured as a result of steps taken by the system to prevent the originating party from hearing his own echo.

Additionally, in some instances, background audio (background noise) on a call may be of great interest. In the traditional single-channel recording techniques, the background audio of a given side of a call may not be recorded during certain portions of the call (e.g., because the party on that side of the call is switched away while an IVR interacts with a party on the other side of the call, etc.). Further, it may be difficult to distinguish which side of a call the background audio is from.

Further, in many instances, it is desirable to re-create a call from the perspective of any selected party. For instance, it may be desirable to selectively hear a recorded call from the perspective of an originating party, or from the perspective of the called party, etc. With the traditional single-channel recording techniques, the recording is limited to capturing only a single perspective at a time. Thus, for a given portion of a call, a reviewer of a call is limited to a recording of only a single perspective in the traditional single-channel recording techniques, and the reviewer is unable to selectively listen to such portion of the call from a different perspective than that captured by the recording system. Accordingly, a desire exists for a recording system that enables greater flexibility in accurately re-creating calls from many different perspectives.

Embodiments of the present invention are directed generally to recording communication of a call utilizing a multi-channel recording technique. According to one exemplary embodiment, inbound communication from each party to a call (e.g., from each communication device that is party to a call) to a recording system is assigned to a separate channel, and communication on each channel is independently recorded. Further, during the call, a control channel is generated that correlates the multiple communication channels. The independently recorded communication channels and control channel may be used to analyze a recorded call from any desired perspective. For instance, communication from a given party may be analyzed in isolation. Further, the control channel enables the recorded multiple communication channels to be correlated such that the communication received (e.g., heard) by any selected party may be accurately re-created for analysis thereof.

Embodiments of the present invention have particular applicability within controlled-environment facilities for recording calls between a resident and other parties. Examples of controlled-environment facilities include correctional facilities (e.g., municipal jails, county jails, state prisons, federal prisons, military stockades, juvenile facilities, detention camps, and home incarceration environments), healthcare facilities (e.g., hospitals, nursing homes, mental health facilities, and rehabilitation facilities, such as drug and alcohol rehabilitation facilities), restricted living quarters (e.g., hotels, resorts, camps, dormitories, and barracks), and the like. Certain controlled-environment facilities may be thought of as a small community or city, perhaps walled or otherwise access restricted, wherein various activities occur within the community and between the community and those outside the community in the daily operation thereof. Such a community may include a number of individuals and enterprises directly associated therewith, including management, staff, and inmates, residents, patients, or guests (herein referred to as "residents"), and a number of individuals and enterprises indirectly associated therewith, including friends and family of residents, vendors, government agencies, providers of services to residents, and individuals with a connection to the facility or its residents. Of course, as those of ordinary skill in the art will recognize, while embodiments the present invention have particular applicability to controlled-environment facilities (because such facilities often have a desire to record calls), the concepts disclosed herein may likewise be employed in other environments.

Embodiments of the present invention can be applied for recording various types of calls. As used herein, except where accompanying language expressly specifies otherwise, a "call" is intended to broadly refer to any communication between two or more parties which can be recorded. Thus, a "call" is not limited to telephony calls, but also encompasses various other types of communication, including text-based communication, video communication, etc. In certain embodiments of the present invention, the call being recorded is substantially a real-time communication between the parties (e.g., as in telephony calls). Further, a telephony call is not limited to calls that are transmitted over a public-switched telephone network, but rather a telephony call may refer to a voice call carried in whole or in part over a packet-switched network, such as a voice-over-IP (VoIP) call, a call conducted locally within a facility (e.g., as with known visitation telephones commonly used in correctional facilities), etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
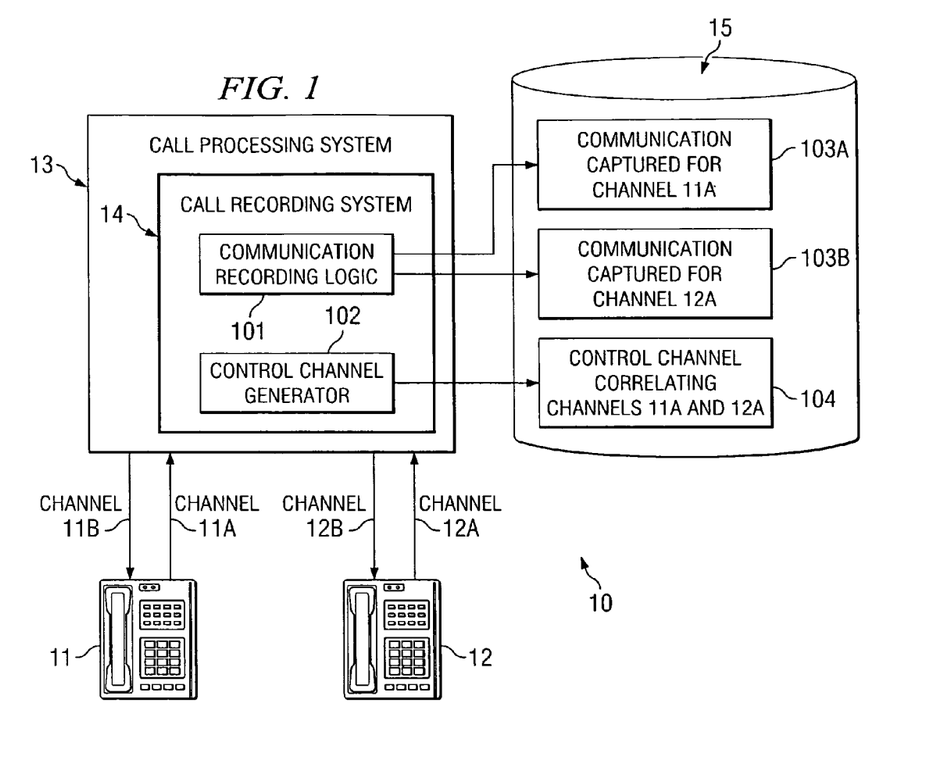
FIG. 1 shows an exemplary system according to one embodiment of the present invention.

FIG. 1 shows an exemplary system 10 according to one embodiment of the present invention. System 10 comprises a first communication device 11 and a second communication device 12, which are operable to communicate with each other. While two communication devices are shown for simplicity in this example, any number of communication devices may participate in a call according to embodiments of the present invention. In this example, first and second communication devices 11 and 12 are shown as telephones; although as discussed further herein, embodiments of the present invention are not limited in application to telephony communication devices. System 10 also comprises a call processing system 13, which is operable to process a call. Call processing system 13 may perform various types of processing on a call, including billing the call, performing checks to ensure that the call is authorized (e.g., in the context of a correctional facility, an inmate may not be authorized to place certain calls, such as calls to judges, victims, etc.), monitoring for unauthorized events during the call (e.g., in certain environments, such as in correctional facilities, certain enhanced telephony activities such as three-way calling are not permitted), etc. In this example, call processing system 13 includes a call recording system 14, and thus call processing system 13 is operable at least to record calls. Call recording system 14 includes communication recording logic 101 and control channel generator 102. As described further below, communication recording logic 101 is operable to record communication for multiple channels of a call, while control channel generator 102 generates a control channel that correlates the recorded communications of the multiple channels.

Thus, according to embodiments of the present invention, a multi-channel call recording system 14 is provided. For instance, each party to a call may be assigned a corresponding channel, and independent recordings of communication on each channel are captured. In the example of FIG. 1, each of communication devices 11 and 12 have an inbound channel (or inbound path) over which communication is directed from such device "inbound" to recording logic 101, and an outbound channel (or outbound path) over which communication is directed outbound from the recording logic to the communication device. As described further herein, the inbound channel of each device is independently recorded by communication recording logic 101. For example, in FIG. 1, the inbound channel of communication device 11 is designated "channel 11A," and an outbound channel for communication device 11 is shown as outbound channel 11B. Likewise, the inbound channel of communication device 12 is designated "channel 12A," and the outbound channel for communication device 12 is shown as outbound channel 12B. In this sense, the inbound channels 11A and 12A are inbound from the perspective of the recording logic 101. That is, inbound channels 11A and 12A carry communication from their respective communication devices 11 and 12, where such communication is captured for recording by call recording system 14. Thus, the communication carried over such inbound channels 11A and 12A may be considered as "outbound communication" from the perspective of the respective communication device 11 and 12, but is referred to herein as an inbound channel because it is inbound from the perspective of the call recording system. Similarly, outbound channels 11B and 12B are outbound from the perspective of the recording logic 101. That is, outbound channels 11B and 12B carry communication to their respective communication devices 11 and 12. Thus, the communication carried over such outbound channels 11B and 12B may be considered as "inbound communication" from the perspective of the respective communication device 11 and 12, but is referred to herein as an outbound channel because it is outbound from the perspective of the call recording system.

Communication recording logic 101 records communication (e.g., audio) captured for channel 11A (i.e., the inbound path of communication device 11) to a data storage medium 15 as recorded communication 103A. Similarly, communication recording logic 101 records communication (e.g., audio) captured for channel 12A (i.e., the inbound path of communication device 12) to data storage medium 15 as recorded communication 103B. Accordingly, independent recordings 103A and 103B are captured for channels 11A and 12A, respectively. Thus, in the illustrated example, audio from telephone 11 is recorded as recording 103A, while audio from telephone 12 is recorded as recording 103B. Data storage medium 15 may comprise any computer-readable medium now known or later developed for storing data, including without limitation disk drive, memory (e.g., random access memory (RAM)), floppy disk, optical disk, Compact Disc (CD), Digital Versatile Disc (DVD), and other data storage devices. Further the data stored thereto may be organized as any suitable data structure, including without limitation a file, database, etc.

During the call, control channel generator 102 generates a control channel comprising information for correlating the communication channels A and B, which is stored to data storage medium 15 as control channel 104. For instance, such a control channel 104 may include information for enabling time-wise correlation of the recorded audio captured for each of channels A and B. Such time-wise correlation indicates, for example, which inbound and outbound channels are communicatively coupled at any point in the call. Thus, it can be determined from such correlation to which communication devices received communication sent from another communication device. Therefore, according to certain embodiments of the present invention, the control channel enables a call to be accurately reconstructed from many different perspectives using the recorded channels. In certain embodiments, the control channel 104, in addition to any synchronization information, contains a "description" of the content for each channel that includes such information as an indication of the relevant sources, input gain adjustments, and/or processing and output gain levels. The control channel 104 may also deal with the recorded data on a "frame" basis that encompasses a period of time and designates starting and ultimately ending frame references for the defined content.

Accordingly, embodiments of the present invention enable a reviewer (a human reviewer, a robotic reviewer, or both) to review the call from any desired perspective. For instance, a reviewer may analyze each of channels 11A and 12A independently. Thus, the reviewer may review all audio of the call (including background audio) inbound to the recording system from telephone 11 via channel 11A by analyzing recorded communication 103A. Similarly, the reviewer may review all audio of the call (including background audio) inbound to the recording system from telephone 12 via channel 12A by analyzing recorded communication 103B. Further, control channel 104 may be used to correlate the audio recorded for each communication channel to enable the reviewer to analyze the call from an eavesdropper's perspective.

Figure 2:
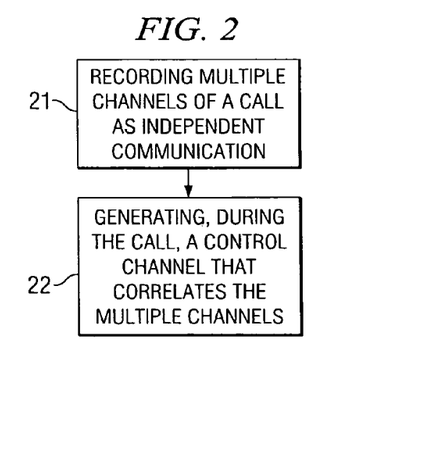
FIG. 2 shows an operational flow according to one embodiment of the present invention.

Turning to FIG. 2, an operational flow according to one embodiment of the present invention is shown. In operational block 21, multiple channels of a call are recorded as independent communication (e.g., independent audio). For instance, in the above example of FIG. 1, communication recording logic 101 records communication for channels 11A and 12A independently as recorded communications 103A and 103B, respectively. In operational block 22, a control channel is generated during the call for correlating the multiple communication channels. For instance, in the above example of FIG. 1, control channel generator 102 generates control channel 104 that correlates the communication recordings 103A and 103B of channels 11A and 12A, respectively. As described further herein, such correlation generally refers to a determination of which communication channels were communicatively coupled at any given point during the call, and in certain embodiments may include other information such as the respective input gain adjustments, etc. for each channel. In other words, the correlation provides an accurate determination of how the recorded channels fit together for accurately reconstructing a call from the perspective of a given party.

Figure 3:
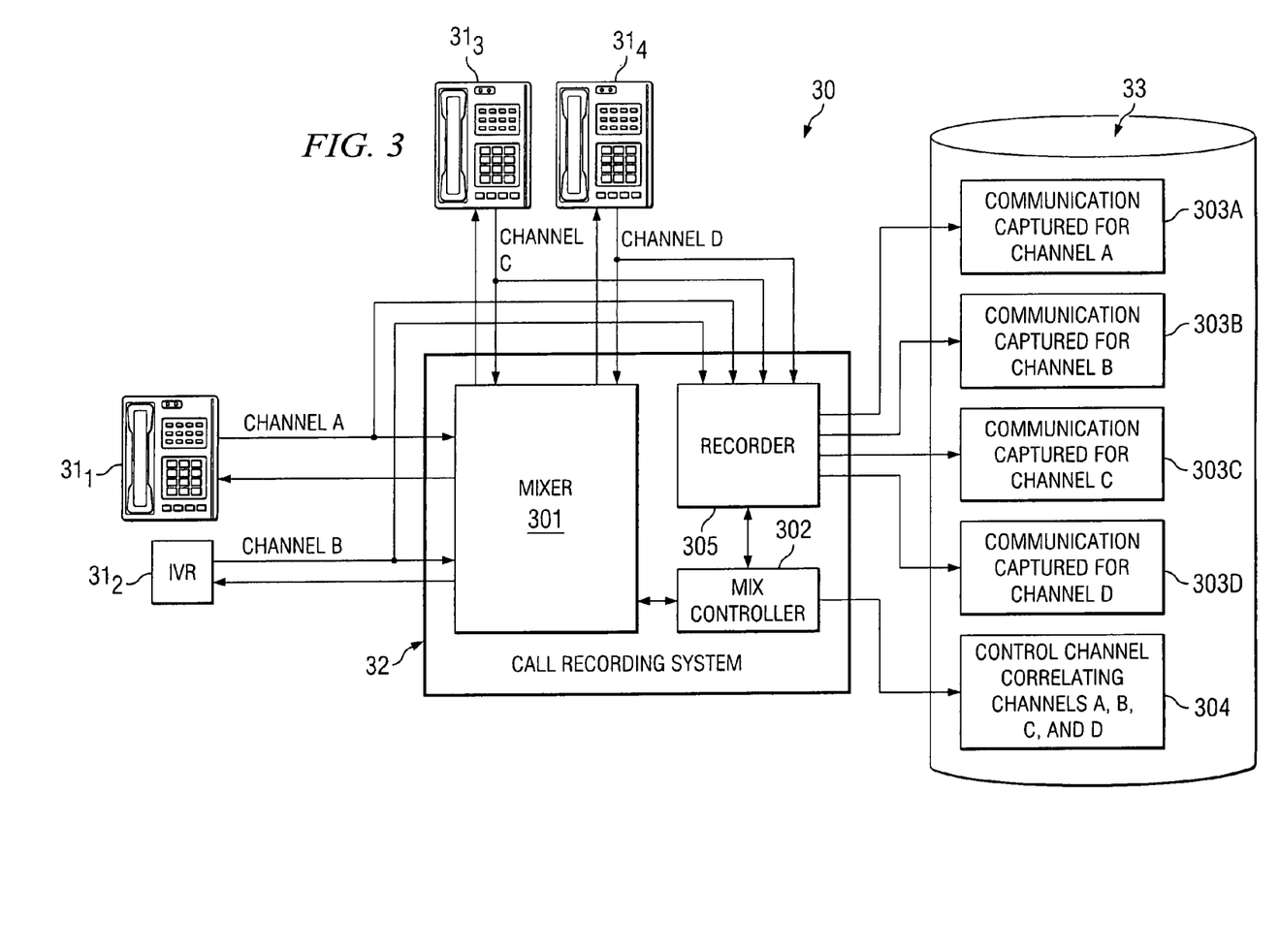
FIG. 3 shows an exemplary system according to one embodiment of the present invention.

FIG. 3 shows an exemplary system 30 according to one embodiment of the present invention. System 30 comprises communication devices $31_1$, $31_2$, $31_3$, and $31_4$, which are operable to communicate with each other. In this example, communication devices $31_1$, $31_3$, and $31_4$ are shown as telephones; although as discussed further herein, embodiments of the present invention are not limited in application to telephony communication devices. Communication device $31_2$ is an IVR that participates on a call. Thus, various parties may participate on a call via communication devices $31_1$-$31_4$ (note that IVR $31_2$ is considered a party to the call). While 4 communication devices are shown in this example for participating on a call, any number of communication devices may participate during a given call in certain embodiments, and embodiments of the present invention are not limited as to the number of communication devices that may be participating on a call.

System 30 also comprises call recording system 32, which may be implemented as part of a call processing 13 as shown in FIG. 1. This exemplary implementation of call recording system 32 includes a mixer 301 that controls who hears what at a given point in time. That is, mixer 301 controls which parties to a call are communicatively coupled to which other parties (e.g., controls which inbound audio received by the mixer 301 from a given party is to be sent to which other parties). In other words, mixer 301 controls the communicative coupling of various inbound and outbound paths of parties to a call. For example, an originating party may use telephone $31_1$ to place a collect call to a called party at telephone $31_3$. When the called party answers telephone $31_3$, IVR $31_2$ may interrupt the call and mixer 301 may switch the originating party out of the communication such that the originating party cannot hear via telephone $31_1$ the communication between IVR $31_2$ and the telephone $31_3$. IVR $31_2$ may inform the called party of the collect call from the originating party and ask the called party if he accepts the charges for the call. If the called party accepts the charges, then mixer 301 may communicatively couple the telephones $31_1$ and $31_3$ to each other such that the originating party can receive via telephone $31_1$ communication from telephone $31_3$ and vice-versa. That is, if the called party accepts the charges for the call, mixer 301 may communicatively couple the inbound path of telephone $31_1$ to mixer 301 with the outbound path of telephone $31_3$, and communicatively couple the inbound path of telephone $31_3$ with the outbound path of telephone $31_1$.

In the example illustrated in FIG. 3, a further party conferences into the call and participates via telephone $31_4$. IVR $31_2$ may interact with one or more of the parties when setting up such conference call, and mixer 301 may selectively couple the inbound and outbound paths of the various communication devices $31_1$-$31_4$ during the course of establishing the conference call, as may be desired. Further, once established, mixer 301 may communicatively couple the outbound channels of each of telephones $31_1$ and $31_3$-$31_4$ with the inbound channels of each other of telephones $31_1$ and $31_3$-$31_4$. Of course, during the call, mixer 301 may selectively change such coupling (e.g., a message from IVR $31_2$ may be generated to one or more of the parties, such as to inform them of a permitted amount of time remaining for the call, etc.), to add new couplings to parties being added to the call, and/or to remove couplings of parties dropping off the call. Thus, not all parties to call have their recordings started at what is designated as "time mark zero" (i.e., the beginning of the recording) for the call. Throughout the call, the recording progresses from time mark zero to "time mark N" at which the call is terminated. The control channel designates those inbound channels (inbound to the recording system) of parties to a call that are connected to outbound channels (outbound from the recording system) of other parties to the call. Thus, the control channel accurately indicates points at which new parties are added during a call, points at which parties drop off the call, etc. In certain embodiments, the mixer 301 also performs many traditional mixing functions, in addition to controlling the communicative connections of the various device channels, such as controlling decibel levels, etc. For instance, mixer 301 may control that audio "A is comprised of B at –6 db and C at –14 db adjusted by –1.5 db", as an example, and video can be indicated by scaling, grid location, etc.

In this example, a mix controller 302 is provided for controlling the mixer 301. Mix controller 302 may, in certain embodiments, control both the IVR $31_2$ (e.g., to ensure the appropriate messages are played, etc.) and the mixer 301. While mixer 301 and mix controller 302 are shown as separate elements in FIG. 3 for ease of illustration, in certain embodiments such mixer 301 and mix controller 302 may be integrated. Further, recording logic 305 is included for capturing audio from each of the channels of a call.

In this example, each party to the call is assigned a corresponding channel, and independent recordings of communication on each channel are captured. In the example of FIG. 3, each of communication devices $31_1$-$31_4$ have an inbound channel and an outbound channel; and the inbound channel of each device (inbound to the recording system) is independently recorded by communication recording logic 305. According to one implementation of the recording logic 305, such recording logic may provide a tap on each one of the inbound channels A-D independently for recording the audio on each individual channel. In the example of FIG. 3, the inbound channels of communication devices $31_1$-$31_4$ are designated as channels A, B, C, and D, respectively. Communication recording logic 305 records communication (e.g., audio) captured for channel A to a data storage medium 33 as recorded communication 303A. Similarly, communication recording logic 305 records communication (e.g., audio) captured for each of channels B-D to data storage medium 15 as recorded communications 303B, 303C, and 303D, respectively. Accordingly, independent recordings 303A-303D are captured for channels A-D, respectively.

Mix controller 302 is operable to adjust the mixer 301 as necessary to control what each of the communication devices receive (on their outbound paths from the recording system). That is, mix controller 302 controls mixer 301 to control which inbound channels of a call each outbound path is communicatively coupled to. Simultaneously, such information indicating which inbound channels each outbound path is communicatively coupled to at a given point during a call is also recorded as a control channel for the call. Thus, mix controller 302 generates control channel 304 in this example. Accordingly, in this example, the inbound paths of each communication device that is a party to a call is independently recorded, and a control channel is also generated which defines which outbound paths are communicatively coupled to which inbound paths at any point during the call. Thus, the call can be accurately re-created from any desired perspective using the independently recorded channels and the corresponding control channel information.

For example, a reviewer desiring to analyze the audio from telephone $31_1$ for a given call in isolation from all other audio on the call, the reviewer may select to analyze the audio of channel A stored as recording 303A. In this manner, the reviewer may be able to listen to all of the audio from telephone $31_1$ during the call. Such audio is available irrespective of whether the audio was actually communicated to another party on the call. For instance, the audio may be captured during a time in which the inbound channel A of telephone $31_1$ is not communicatively coupled (by mixer 301) to any outbound channels (outbound from recording system 32) to any other communication devices on the call. Further, background audio at telephone $31_1$ may be included in the recording 303A of channel A, thus allowing the reviewer to more easily hear such background audio without interference from foreground or background audio of other inbound channels B-D on the call and allowing the reviewer to verify from which communication device on the call the background audio is from.

Each of inbound channels B-D may likewise be analyzed in isolation from the other inbound channels is so desired. Further, the reviewer may select to hear the call from the perspective of any party to the call or from the perspective of an eavesdropper to the call. For instance, suppose a reviewer desires to hear the call from the perspective of the telephone $31_1$; in this case, those recordings 303B-303D of inbound channels B-D may be combined in accordance with control channel 304 to form the audio of the call as heard from the perspective of the telephone $31_1$. For instance, for any given point in the call, it may be determined which of channels B-D are communicatively coupled to the outbound channel (outbound from recording system 32) to telephone $31_1$, and the audio captured for those channels determined to be coupled to the outbound channel of telephone $31_1$ at such given point in the call are combined to form the audio heard from the perspective of telephone $31_1$ at such given point in the call.

According to one embodiment, a software application is provided with which a user may interact to select a desired perspective for call analysis of a given call, where the software application can, based on the selected perspective, use the control channel for the given call and the recorded communication channels to recreate the desired perspective. Such a software application may be stored to computer-readable medium (e.g., hard disk, memory, floppy disk, optical disc, etc.), and executed by a processor to read the captured recordings for inbound channels of a call (e.g., recordings 303A-303D of FIG. 3) and the control channel for such call (e.g., control channel 304 of FIG. 3) to create communication of the call from a desired perspective (e.g., either audio of an isolated channel, or audio heard from a particular party's perspective, etc.) in the manner described above.

Figure 4:
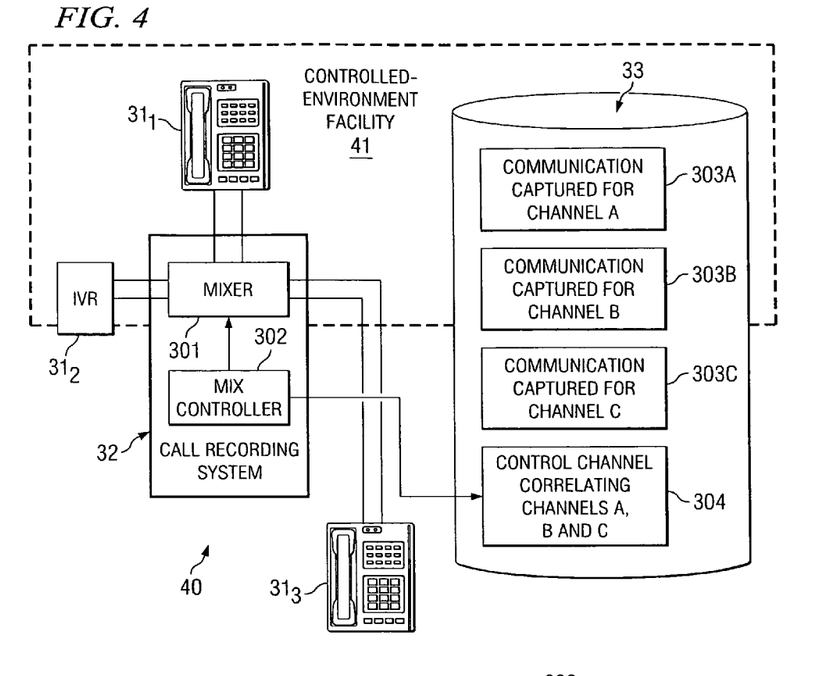
FIG. 4 shows an exemplary system employed for a controlled-environment facility in accordance with one embodiment of the present invention.

Embodiments of the present invention have particular applicability within controlled-environment facilities for recording calls between a resident and other parties. Examples of controlled-environment facilities include correctional facilities (e.g., municipal jails, county jails, state prisons, federal prisons, military stockades, juvenile facilities, detention camps, and home incarceration environments), healthcare facilities (e.g., hospitals, nursing homes, mental health facilities, and rehabilitation facilities, such as drug and alcohol rehabilitation facilities), restricted living quarters (e.g., hotels, resorts, camps, dormitories, and barracks), and the like. FIG. 4 shows an exemplary system 40 implemented for recording calls for a controlled-environment facility 41 according to one embodiment of the present invention. As shown, a resident of controlled-environment facility 41 may use telephone $31_1$ (or other communication device) to communicate with another party, such as a party internal to controlled-environment facility 41 (e.g., such as a visiting party using a visitation telephone (not shown)) or a party external to controlled-environment facility 41 using telephone $31_3$ (or other communication device). Call recording system 32 and data storage 33 may be used in the manner described above with FIG. 3 for recording the call. Further, IVR $31_2$ may also participate on the call in the manner described above with FIG. 3.

IVR $31_2$, recording system 32, and data storage 33 are each shown arranged on the dashed line that designates controlled-environment facility 41 in FIG. 4, as each of these elements may be implemented in whole or in part internal or external to controlled-environment facility 41. For instance, in certain embodiments, call recording system 32 and data storage 33 may be implemented in a central server that monitors calls for one or more controlled-environment facilities, such as controlled-environment facility 41. The various elements may be communicatively coupled via a communication network, such as a PSTN, wireless network, the Internet, etc., using well-known networking techniques. Further, in certain embodiments, various parts of the call recording system 32 may be implemented in a distributed fashion.

Figure 5:
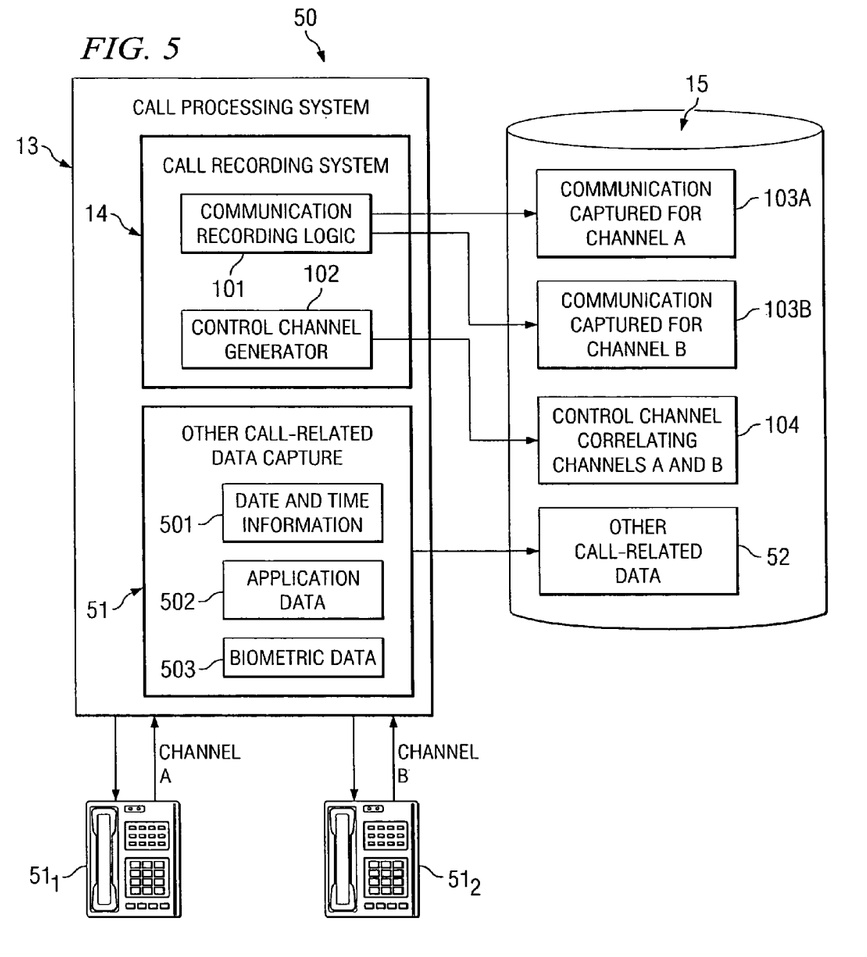
FIG. 5 shows an exemplary system for recording various information for a call according to one embodiment of the present invention.

Turning to FIG. 5, another exemplary system 50 according to one embodiment of the present invention is shown. In this example, a communication device $51_1$ (e.g., telephone) communicates with a communication device $51_2$ (e.g., telephone), and call recording system 14 of call processing system 13 records such call. As described above with FIG. 1, communication recording logic 101 captures recording 103A for inbound communication channel A from telephone $51_1$, and communication recording logic 101 captures recording 103B for inbound communication channel B from telephone $51_2$. Further, as described above with FIG. 1, control channel generator 102 generates control channel 104 for correlating the recordings 103A and 103B for the call. As further shown in FIG. 5, in certain embodiments other call-related data may be captured and stored for the call. For instance, logic 51 may be included for capturing date and time information 501, application data 502, biometric data 503 (e.g., identifying one or more parties to the call), and/or other related data for the call. The captured related data may be stored to data storage 15 as data 52.

Figure 6:
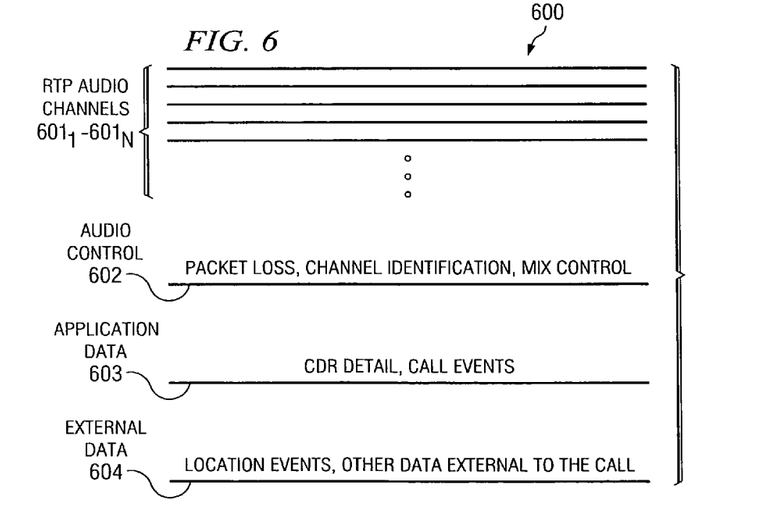
FIG. 6 shows an example of recorded information for a call according to one embodiment of the present invention.

Turning to FIG. 6, an exemplary recording 600 (e.g., "call record") for a call according to one embodiment of the present invention is shown. As shown, a plurality of audio channels $601_1$-$601_N$ for N communication devices that are party to the call are recorded. Examples of such audio channels are described above as recordings 103A and 103B of FIG. 1, recordings 303A-303D of FIG. 3, recordings 303A-303C of FIG. 4, and recordings 103A-103B of FIG. 5. As described above, each audio channel records communication of a corresponding inbound channel from a communication device that is party to a call, independent of communication on other inbound channels of the call.

Audio control 602 (or "control channel") is also generated and included in call record 600. Examples of such audio control 602 are described above as control channels 104 and 304 of FIGS. 1 and 3-5. As shown in this example, audio control 602 may include packet loss information, channel identification information, and mix control information. Packet loss information describes about the number of packets lost during the communication, for example. Channel identification information describes the channel of recorded communication. As described above, the mix control information indicates for any point in the call which inbound channels and outbound channels to the recording system of the communication devices that are party to the call are communicatively coupled such that the outbound channel to a device can hear audio from the inbound channel from another device (e.g., as controlled by mixer 301). Similarly, while the above description refers to audio, it may be equally applied additionally or alternatively to recorded video and/or other types of communication.

Application data 602 is also included in recording 600, which may include call detail record ("CDR") detail and call event information. CDR data and techniques for capturing such CDR data are well-known, and are thus not described further herein. Call event information may include information about events that occurred during the call, such as an attempted three-way connection, etc. Various types of such call events and techniques for detecting the events are known in the art, and any such call event information and techniques for detecting the events may be used with embodiments of the present invention.

Finally, external data 604 may be included in recording 600, which may include location events and/or other data external to the call. Such data may include information identifying the location of the telephone being used by a resident of a controlled-environment facility, for example.

It should be noted that as those of ordinary skill in the art will appreciate, the recording of an inbound channel of a party communication device to a recording system may involve use of any of various disciplines of interfacing one device with another. In an analog implementation, the interface may be a two-wire to four-wire conversion to capture the analog outbound communication, for example. In a digital implementation, the digital inbound communication may be captured off of a time-division multiplexing ("TDM") path within a switching network, passed through a digital signal processor ("DSP") to be converted into recordable voice data, for example. In a Voice-over-IP (VOIP) implementation, the packets may be selectively taken off an IP network to correspond to the different inbound channels. In such a VOIP implementation, a media or conference bridge may choose to generate an real-time transport protocol ("RTP") stream of its own to convey the packets to a recording device, and the RTP stream could have multiple sources within it designating the multiple inbound channels that are occurring at one point in time. Any technique now known or later developed for transmission of communication may be used in accordance with embodiments of the present invention, wherein embodiments of the present invention designate an inbound channel (inbound to a recording system) for each party device to a call and record all communication on each inbound channel independent of communication on other inbound channels of the call.

Further, while the control channel is described above as being separate from the communication channels, in certain implementations, such as in a VOIP implementation, such control channel may be embedded within a single data path that contains the distinct elements of each inbound channel and the control channel, which may be captured by a recording system. Thus, in certain embodiments, the control channel may be embedded within a communication path that transmits one or more of the inbound channels of communication, but such communication path (e.g., VOIP packets) is organized in a manner that distinctly identifies the control channel and each inbound channel that it carries.

In view of the above, according to embodiments of the present invention a control channel is generated during a call which correlates the independently recorded communication channels of the call. It should be recognized that in the exemplary embodiments described above, the control channel is generated in substantially real-time as the call is occurring. For instance, in one embodiment, the control channel is generated as a mix controller 302 controls a mixer 301 for dynamically communicatively coupling selected ones of inbound (channels with selected ones of outbound channels of a call. In certain embodiments, the control channel is generated in real-time as commands get to the mixer and is thus synchronized with any frame-level switching of the data paths such that during a "playback" session (of a reconstructed call) the control channel data arrives with (or between) the frames where changes are occurring. Such real-time generation of the control channel enables an absolutely accurate correlation of the captured communication channels for any given perspective.

According to one implementation of the control channel, information is included to keep track of what each party communication device to a call can hear at a given time. Such control channel identifies what a given party device can hear as a summation of all the recorded inbound communication channels from the other party devices to the call that are communicatively coupled the outbound path (from the recording system) to the given party device at the given time of interest. So, if a call has 5 party communication devices, the control channel (according to one exemplary implementation) keeps track of what each of the five party devices can hear (i.e., what audio they can receive via their outbound channels from the recording system) at a given point in time, and as the mixer changes which inbound and outbound channels are communicatively coupled during the call, the control channel updates its information to reflect such changes for the corresponding points in the call. Thus, this information can be later used to accurately re-create the call from any desired perspective that may be of interest.

According to another exemplary implementation of the control channel, information is provided therein to designate "listen groups." While very similar to the first implementation described above, this implementation is subtly different. For instance, a control channel may specify for a call a "listen group A" that contains certain party devices to the call, and then further information in the control channel defines the listen group A as being a sum of certain "talker devices" on the call which have inbound channels (inbound to the recording system) to which the listen group's outbound channels (outbound from the recording system) are communicatively coupled. At that point if the talker devices are changing rapidly during the call but the same group of listening devices remains relatively constant, the control channel can be simplified to only add and subtract party devices from the talker group(s) for each listen group that may be used to properly represent all the participant devices that are listening on the call.

This second implementation might be particularly useful for, say, a seminar in which a few speakers are presenting to a large number of listeners. Such implementation may designate each of the communication devices used by the presenters a "talker" devices and designate all other party devices to the call as part of a listen group. Then, if on occasion during the seminar a party in the listen group speaks (e.g., to ask a question, etc.), the control channel may designate a shift in the listening groups to the call at the corresponding point in the call. Thus, this technique may minimize the amount of data that is managed by the control channel for accurately reflecting how the various outbound and inbound channels to a call are correlated throughout the call. This exemplary implementation may also benefit from the use of "key frames" in the control channel that would appear on a regular interval identifying the groups and "talkers" involved to allow quick synchronization to a midpoint during playback without having to locate the last point where a mixing change occurred.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
performing, by a computing system,
receiving a first audio signal via a first audio channel corresponding to a first outbound path of a first communication device operated by a first party to a communication, wherein the first party is a resident of a controlled-environment facility;
storing the first audio signal in a memory;
receiving a second audio signal via a second audio channel corresponding to a second outbound path of a second communication device operated by a second party to the communication, wherein the second party is a non-resident of a controlled-environment facility;
storing the second audio signal in the memory, the second audio signal stored separately from the first audio signal;
generating a control signal that includes information configured to enable a temporal correlation between the first and second audio signals, the control signal configured to classify the first communication device in a subset of communication devices in a listening group and the second communication device in another subset of the communication devices in a talking group, and to dynamically re-classify the first communication device into the talking group and out of the listening group as the communication progresses; and
storing the control signal in the memory.

2. The method of claim 1, further comprising:
performing, by the computing system,
receiving a third audio signal via a third audio channel corresponding to a third outbound path of a third communication device involved in the communication; and
storing the third audio signal in the memory.

3. The method of claim 2, wherein the third device is an interactive voice response (IVR) system configured to set up the communication between the first and second parties.

4. The method of claim 3, wherein at least a portion of the first audio signal corresponds to a period of time during the communication when the first party is in communication with the IVR system and not in communication with the second party.

5. The method of claim 4, wherein at least another portion of the first audio signal corresponds to a subsequent period of time during the communication when the first party is not in communication with the second party and the IVR system is in communication with the second party.

6. The method of claim 5, wherein at least yet another portion of the first audio signal corresponds to a yet subsequent period of time during the communication when the first party is in communication with the second party.

7. The method of claim 1, wherein the control signal indicates a point in time where a third party is added to the communication.

8. The method of claim 7, wherein the control signal indicates another point in time where at least one of the first, second, or third parties leaves the communication.

9. The method of claim 1, wherein the control signal is embedded within at least one of the first or second audio signals.

10. The method of claim 1, further comprising:
performing, by the computing system,
generating an application data signal that includes call detail record information with respect to the communication; and
storing the application data signal in the memory.

11. The method of claim 10, wherein the application data signal indicates a three-way calling event occurring during the progress of the communication.

12. The method of claim 1, further comprising:
performing, by the computing system,
generating an external data signal that includes location information with respect to the first party; and
storing the external data signal in the memory.

13. The method of claim 1, further comprising:
performing, by the computing system,
in response to a selection by a user, enabling reconstruction of the communication from the perspective of the first party at least in part by allowing the user to playback the second audio signal to the exclusion of the first audio signal.

14. The method of claim 1, further comprising:
performing, by the computing system,
in response to a selection by a user, enabling identification of the origin of a sound at least in part by allowing the user to selectively playback one of the first or second audio signals to the exclusion of the other.

15. A system, comprising:
a processor; and
a memory coupled to the processor, the memory configured to store program instructions, and the program instructions executable by the processor to cause the system to:
receive a plurality of audio signals, each of the plurality of audio signals corresponding to a respective one of a plurality of audio channels, each of the plurality of audio channels corresponding to a single outbound path of a respective one of a plurality of communication devices, each of the plurality of the communication devices operated by a different party to a same communication;
separately store each of the plurality of audio signals;
generate a control signal that includes information configured to enable a temporal correlation among the plurality of audio signals, the control signal configured to classify a subset of the plurality of communication devices in a listening group and another subset of the plurality of communication devices in a talking group, and to dynamically re-classify a given communication device into the talking group and out of the listening group as the communication progresses; and
store the control signal.

16. The system of claim 15, wherein a first one of the different parties is a resident of a controlled-environment facility, and wherein a second one of the different parties is a non-resident of the controlled-environment facility.

17. The system of claim 15, further comprising receiving an audio signal from an interactive voice response (IVR)

system configured to set up the communication between a first one of the different parties and a second one of the different parties.

18. The system of claim 17, the program instructions further executable by the processor to cause the system to:
store a first portion of a first audio signal corresponding to a first period of time during the communication when a first one of the different parties is in communication with the IVR system and not in communication with a second of the different parties;
store a second portion of the first audio signal corresponding to a second period of time during the communication when the first one of the different parties is not in communication with the second one of the different parties and the IVR system is in communication with the second one of the different parties; and
store a third portion of the first audio signal corresponding to a third period of time during the communication when the first one of the different parties is in communication with the second one of the different parties.

19. The system of claim 15, the program instructions further executable by the processor to cause the system to:
generate an application data signal that includes call detail record information with respect to the communication; and
store the application data signal.

20. The system of claim 15, the program instructions further executable by the processor to cause the system to:
generate an external data signal that includes location information with respect to a given one of the different parties; and
store the external data signal.

21. The system of claim 15, the program instructions further executable by the processor to cause the system to:
in response to a command from a user, enable reconstruction of the communication from the perspective of a first one of the different parties at least in part by allowing the user to playback a portion of the plurality of audio signals that excludes an audio signal corresponding to the first party.

22. The system of claim 15, the program instructions further executable by the processor to cause the system to:
in response to a command from a user, enable identification of the origin of a sound at least in part by allowing the user to selectively playback at least a given one of the plurality of audio signals to the exclusion of at least another one of the plurality of audio signals.

23. A tangible computer-readable storage medium having program instructions stored thereon that, upon execution by a computing system, cause the computing system to:
receive a first audio signal via a first audio channel corresponding to an outbound path of a first communication device operated by a first party to a communication;
receive a second audio signal via a second audio channel corresponding to an outbound path of a second communication device operated by a second party to the communication;
generate a control signal that includes mixing information configured to correlate the first and second audio signals, the control signal configured to classify the second communication device in a subset of communication devices in a listening group and the first communication device in another subset of the communication devices in a talking group, and to dynamically re-classify the second communication device into the talking group and out of the listening group as the communication progresses;
generate an application data signal that includes call detail record information with respect to the communication;
generate an external data signal that includes location information with respect to at least one of the first or second parties to the communication;
store the first audio signal, the second audio signal, the control signal, the application data signal, and the external data signal.

24. The tangible computer-readable storage medium of claim 23, wherein the first party is a resident of a controlled-environment facility, and wherein the second party is a non-resident of the controlled-environment facility.

25. The tangible computer-readable storage medium of claim 23, further comprising receiving a third audio signal from an interactive voice response (IVR) system configured to set up the communication between the first and second parties.

26. The tangible computer-readable storage medium of claim 25, wherein to store the first audio signal, the program instructions upon execution by the computing system further cause the computing system to:
store a portion of the first audio signal corresponding to a first period of time during the communication when the first party is in communication with the IVR system and not in communication with the second party;
store another portion of the first audio signal corresponding to a second period of time during the communication when the first party is not in communication with the second party and the IVR system is in communication with the second party; and
store yet another portion of the first audio signal corresponding to a third period of time during the communication when the first party is in communication with the second party.

27. The tangible computer-readable storage medium of claim 23, wherein the program instructions upon execution by the computing system further cause the computing system to:
in response to a command from a user, enable reconstruction of the communication from the perspective of the first party at least in part by allowing the user to playback the second audio signal to the exclusion of the first audio signal.

28. The tangible computer-readable storage medium of claim 23, wherein the program instructions are executable by the processor to further cause the system to:
in response to a command from a user, enable identification of the origin of a sound at least in part by allowing the user to selectively playback the first audio signal to the exclusion of the second audio signal.

* * * * *